United States Patent [19]

Baker et al.

[11] Patent Number: 4,482,129
[45] Date of Patent: Nov. 13, 1984

[54] ALL METAL VALVE STRUCTURE FOR GAS SYSTEMS

[75] Inventors: Ray W. Baker, Hamilton; Donald A. Pawlak, Centerville; Alford J. Ramey, Miamisburg, all of Ohio

[73] Assignee: The United States of America as represented by the United States Department of Energy, Washington, D.C.

[21] Appl. No.: 387,114

[22] Filed: Jun. 10, 1982

[51] Int. Cl.³ ............................ F16K 1/14; F16K 1/42
[52] U.S. Cl. .................................... 251/334; 251/368; 251/361
[58] Field of Search ............... 251/334, 210, 368, 331, 251/361, 362

[56] References Cited

U.S. PATENT DOCUMENTS

| | | |
|---|---|---|
| Re. 31,417 | 10/1983 | Huber .............................. 251/334 X |
| 1,908,440 | 5/1933 | Milton . |
| 2,571,433 | 10/1951 | Fine et al. ......................... 251/361 X |
| 2,682,977 | 7/1954 | Spiess, Jr. et al. ............... 251/331 X |
| 2,963,262 | 12/1960 | Shafer . |
| 3,014,690 | 12/1961 | Boteler . |
| 3,022,978 | 2/1962 | Kowalski ........................... 251/362 |
| 3,096,966 | 7/1963 | McFarland, Jr. . |
| 3,106,219 | 10/1963 | Teston . |
| 3,160,391 | 12/1964 | Medicus et al. . |
| 3,489,171 | 1/1970 | Michael, Jr. et al. . |
| 3,548,869 | 12/1970 | Weise et al. . |
| 4,105,187 | 8/1978 | Huber .................................. 251/334 |
| 4,126,295 | 11/1978 | Natalizia ........................ 251/368 X |

FOREIGN PATENT DOCUMENTS

| | | |
|---|---|---|
| 156309 | 6/1939 | Fed. Rep. of Germany ...... 251/361 |
| 439138 | 11/1935 | United Kingdom . |

Primary Examiner—Arnold Rosenthal
Attorney, Agent, or Firm—George H. Libman; Albert Sopp; Michael F. Esposito

[57] ABSTRACT

A valve assembly with a resilient metal seat member is disclosed for providing a gas-tight seal in a gas handling system. The valve assembly also includes a valve element for sealing against the valve seat member; and an actuating means for operating the valve element. The valve seat member is a one-piece stainless steel ring having a central valve port and peripheral mounting flange, and an annular corrugation in between. A groove between the first and second ridges serves as a flexure zone during operation of the valve member and thus provides the seating pressure between the inner ridge or valve seat and the valve element. The outer annular ridge has a diameter less than said valve element to limit the seating motion of the valve element, preventing non-elastic deformation of the seat member.

6 Claims, 3 Drawing Figures

ALL METAL VALVE STRUCTURE FOR GAS SYSTEMS

The United States Government has rights in this invention pursuant to Contract No. DE-AC04-76DP00053 between the United States Department of Energy and the Monsanto Company (the Monsanto Research Corporation).

BACKGROUND OF THE INVENTION

The present invention relates to the field of valves for gas handling systems, and more particularly, to a valve seat assembly providing a highly reliable gas-tight seal.

In the art of valves for gaseous systems, obtaining an effective seal between the movable valve element and the valve seat is an essential requirement. To obtain an effective seal, in U.S. Pat. No. 3,489,171 of Michael, et. al., a soft gold metal valve seat is permanently preformed under the pressure of the valve element. The theory is that the preformed seat is thus assured of conforming to the shape of the element during valve use. In U.S. Pat. No. 3,106,219 of Teston, a soft metal alloy seat is likewise used to provide a seal with a metal ball valve element. In the two patents cited above, successful operation of the valve is dependent upon the non-elastic deformation of the valve seat resulting from the flow of the valve seat metal when in contact with the valve element under pressure. In both patents, permanent deformation of the valve seat metal occurs during operation of the valve.

Permanent deformation, however, presents a difficulty when, during routine maintenance procedures, an original valve element is replaced by a new valve element. It is difficult to provide an adequate gas seal between a new valve element and a previously permanently deformed metal valve seat. To rework a permanently deformed valve seat requires great effort with particular attention being paid to valve element alignment, concentricity, surface finish, seating angle, and stroke distance.

Another approach for providing valve seals for gaseous systems is the use of a resilient O-ring such as disclosed in U.S. Pat. No. 2,963,262 of Shafer and U.S. Pat. No. 3,548,869 of Weise, et. al. A serious problem associated with the use of an O-ring is the possibility of a blow-out under high pressure conditions. Another problem associated with the use of an O-ring is contamination of the gas in the system by the material from which the O-ring is fabricated, usually organic polymeric materials. This contamination is especially undesirable in gas handling systems for high purity gases used for instrument calibration.

SUMMARY OF THE INVENTION

Accordingly, it is a primary object of the present invention to provide an effective metal valve seat member obviating the need for permanent deformation of the valve seat member.

Another object of the invention is to provide a resilient metal valve seat not requiring reworking when the original valve element is replaced with a new element.

Another object of the invention is to provide an effective valve seat made exclusively from metal material so that the gases that are handled are not contaminated.

To achieve the foregoing and other objects, and in accordance with the purposes of the present invention as described herein, an improved valve seat member is provided for maintaining a gas-tight seal in a gas handling system. The invention includes the novel approach of having the valve seat member made from a metal having resilient or elastic properties. The valve seat member is comprised of a thin metal ring having a central valve port and having annular corrugations defining an inner valve seat portion providing a sealing engagement with a valve element, and an outer stop portion. The ring is adapted to flex along an annular groove between the corrugations to provide a seating pressure when in engagement with the valve element.

Preferably, the valve seat member is made from formed stainless steel. The outer mounting flange surfaces of the member form a leak-proof seal with the inner wall of the assembly. The valve seat member of the invention provides elastic deformation of the valve seat against the valve element. When a new valve element replaces the original valve element, the valve seat member of the invention readily conforms to the shape of the new valve element without the need for reworking.

In accordance with another aspect of the invention, a valve assembly for a gas handling system comprises a valve seat member of the invention in combination with a valve element providing a gas-tight seal when in contact with the valve seat member. Further included in the assembly is an actuating means for operating the valve element. Preferably, the valve element is a ball fabricated from tungsten carbide providing a durable and long lasting valve element.

By providing an all metal valve assembly in accordance with the invention, gases handled by the system are not subject to contamination by organic materials that may erode from sealing elements, such as rubber O-rings. Also, there is no danger of blow-out of the valve with an all metal seat member.

Still other objects of the present invention become readily apparent to those skilled in this art from the following description wherein there is shown and described a preferred embodiment of this invention, simply by way of illustration of the best modes contemplated for carrying out the invention. As it will be realized, the invention is capable of other different embodiments, and its several details are capable of modifications in various, obvious aspects all without departing from the invention. Accordingly, the drawings and the descriptions will be regarded as illustrative in nature and not as restrictive.

BRIEF DESCRIPTION OF THE DRAWINGS

The accompanying drawings, incorporated in and forming a part of the specification, illustrate several aspects of the present invention and together with the description serve to explain the principles of the invention. In the drawings.

DETAILED DESCRIPTION OF THE INVENTION

Figure 1:
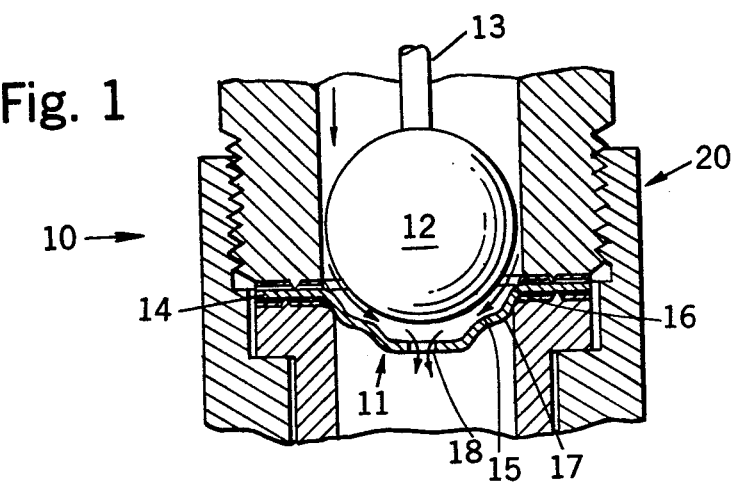
FIG. 1 is a cross-sectional view of a valve assembly of the invention in the open position.

Reference is now made to FIG. 1 showing an improved valve assembly 10 comprising valve seat member 11 of the invention, valve element 12, and valve actuator 13. Valve seat member 11 is a metal ring having a peripheral mounting flange 14 and corrugation structures including inner annular ridge 15 which serves as a valve seat, outer annular ridge 16 which serves as a valve element stop, and annular groove 17 which serves to flex during operation and provide the sealing pressure of inner annular ridge 15 against valve element 12. Mounting flange 14 is secured in housing 20 wherein a gas flow, depicted by arrows, occurs. The gas flow follows a course around valve element 12 and through central port 18 in valve seat member 11.

Figure 2:
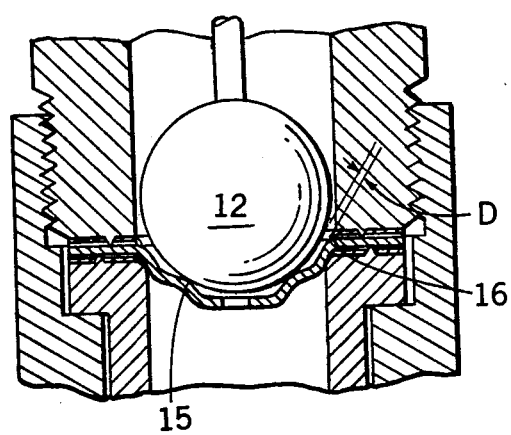
FIG. 2 is a cross section of the valve assembly of the invention in a partially closed position.

FIG. 2 shows valve element 12 just touching inner annular ridge 15, with D demonstrating the clearance between valve element 12 and outer annular ridge 16. In this position the flow of gas through valve assembly 10 is reduced but not stopped. As element 12 continues to push against member 11, groove 17 flexes to seal ridge 15 against element 12, stopping the flow of gas through the valve assembly.

Figure 3:
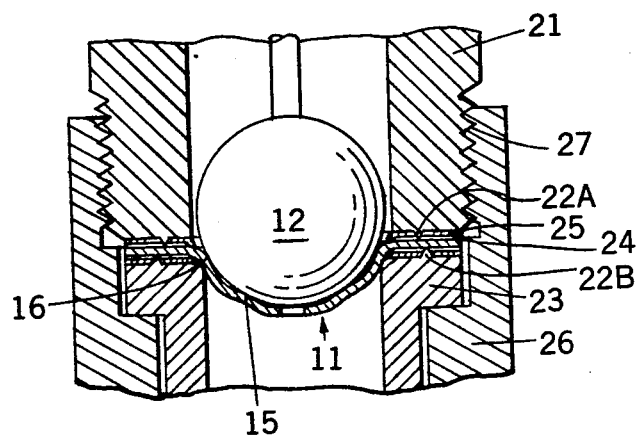
FIG. 3 is a cross section of the valve assembly of the invention in a fully closed position wherein the motion of the valve element is limited.

FIG. 3 shows valve assembly 10 with valve element 12 being at the furthermost position from actuator 13. Inner annular ridge 15 maintains sealing contact with valve element 12 by the tension of member 11, which member is neither stretched nor distorted beyond its elastic limit. Since the diameter of valve element 12 is greater than the diameter of outer annular ridge 16 and underlying lower housing portion 23, valve element 12 is prevented from overstretching and non-elastically deforming valve seat member 11. Therefore, when valve element 12 is retracted to the valve-open position shown in FIG. 1, valve seat member 11 will also return to its original shape as shown in FIG. 1.

Housing 20 preferably includes an upper portion 21 having a central bore for the gas flow of greater diameter than the diameter of valve element 12. Housing 20 also includes lower portion 23 aligned with upper portion 21 and having a central bore of lesser diameter than valve element 12. The opposing end surfaces of each of the housing portions 21 and 23 include an annular knife edge 22A, 22B for cutting into and firmly holding flange 14 when the halves are joined. To ensure that each knife edge forms a rigid, gas-tight seal with flange 14, each side of flange 14 is plated with a nickel base layer 24 and a relatively soft copper outer layer 25. Housing 20 also includes a collar 26 having screw threads 27 for engaging with opposing threads on the outer surface of upper portion 21 to hold the valve assembly together.

Preferably, valve seat member 11 is fabricated from a blank of stainless steel having a uniform thickness determined by the gas pressures at which the valve is designed to operate. The minimum thickness is limited by the strength requirement imposed by the pressure of the gas against the open valve. The maximum thickness is limited by the tendency of thicker members to deform or crack under repeated flexing. In addition to stainless steel, valve seat member 11 may also be fabricated from any other ductile material that can be formed such as carbon steel and brass. Stainless steel was selected for the preferred embodiment because its high corrosion resistance reduces gas contamination. Spring temper steels are not used for valve seat member 11 because they strain harden rapidly and, therefore, crack and break apart upon forming. Because the entire structure of valve assembly 10 is metal, the gases controlled by the valve assembly are not subjected to synthetic polymeric contamination, making this invention particularly useful for instrument calibration where the use of non-contaminated gas is of particular importance.

Valve seat member 11 is most conveniently and economically formed by rubber diaphragm forming techniques in which a lower solid cylindrical flat bottom punch and metal draw ring are placed into the forming apparatus (not shown). A solid ringshaped valve seat member forming die is then placed on the flat bottom surface of the punch which both supports the die and forces it upward through a hole in the draw ring. A stainless steel disk is centered over the valve seat member forming die and hole in the draw ring. The upper rubber diaphragm pressure chamber is lowered over the disk, draw ring, forming die and punch. This chamber is then pressurized to hold the disk flat against the draw ring. The punch drives the forming die and disk into the isostatically pressurized rubber diaphragm chamber, forming the disk around and to the contour of the valve seat member forming die. The formed disk is valve seat member 11. Since the diaphragm is isostatically pressurized, it stretches and conforms to any shape and damage does not result. A commercially available rubber diaphragm forming technique is known as Hydroforming. A Cincinnati Millacron Hydroform Model (12-15-7) has been used to manufacture the valve seat members of this invention.

In the finished product, port 18 is a standard drilled-through hole. A valve seat member fixture is machined to the inner contour of valve seat member 11 to both support and align the valve seat during the drilling operation, thereby centering the port 18 gas flow-through hole. Following drilling, the flow-through hole is deburred and the inner contour of annular ridge 15 is polished to provide a smooth surface for leak-free sealing with a valve element.

A valve seat assembly 10 incorporating a valve seat member 11 of the invention has a wide variety of applications. For example, valve seat member 11 of the invention may be used in a one-way valve (as shown in FIGS. 1–3), a two-way valve, a three-way valve, a valve having a floating member, a relief valve, a solenoid-operated valve, and other conventional valves.

As described above, a valve assembly 10 in accordance with the invention may be used with positive pressure gas handling systems. In addition, the valve assembly of the invention may be used in vacuum systems.

The valve assembly 10 of the invention may be used within an all metal bellows valve, thereby providing a valve assembly not readily subject to material degradation which might contaminate gases within the system.

In one embodiment of the invention, stainless steel housing 20 includes lower portion 22 with an inner diameter of 14.4 mm, and tungsten carbide element 12 has a diameter of 15.88 mm. Stainless steel ring 11 has a thickness of 0.18 mm, a diameter at ridge 16 of 14 mm and a diameter at ridge 15 of 10 mm. The diameter of port 18 is 1.59 mm. Each side of flange 14 is plated with a thin nickel layer 20 and a thicker copper layer 21 totaling 0.04 mm thickness. The clearance D of FIG. 2 is about 0.1 mm and groove 17 flexes port 18 about 0.09 mm before element 12 bottoms against ridge 16. This valve was cycled 4000 times and then found to have a leak rate less than $10^{-8}$ cm$^3$/sec He, the measurement limit of the leak detector.

In summary, numerous benefits have been described which result from employing the concepts of the invention. With the invention, valve seat member 11 is fabricated from stainless steel providing an elastic valve seat member. Corrugations include inner annular ridge 15 serving as a valve seat against valve element 12 and outer annular ridge 16 serving as a valve element stop preventing non-elastic deformation of inner annular ridge 15. Groove 17 flexes during operation of valve seat member 11, and provides a constant sealing pressure of inner annular ridge 15 against valve element 12. Mounting flange surface 14 is preferably coated with a thin base layer of nickel and a thicker top layer of copper, the dual coating providing increased sealing and holding characteristics with the body housing 20. Preferably, valve element 12 is fabricated from a long lasting and durable material such as tungsten carbide. When seat member 11 is replaced, the inner annular ridge 15 readily conforms to the shape of the existing valve element 12; and no reworking of inner annular ridge 15 is necessary.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A valve structure comprising:
    a valve housing having an upper portion of first diameter aligned with and connected directly to a lower portion of second diameter;
    a ball valve element moveable within said housing and having a diameter less than the first diameter and greater than the second diameter;
    a resilient corrugated metal ring having an outer flange forming a gas-tight seal with said valve housing at the connection of said upper and lower portions, said ring having;
    an outer annular ridge having a diameter less than the diameter of said valve element for limiting the motion of said element and thereby preventing nonelastic deformation of said ring;
    an inner annular ridge for providing a gas-tight seal with said element;
    a central opening adjacent to said inner ridge forming a valve port; and
    an annular groove connecting said outer ridge and said inner ridge for flexing and for providing seating pressure when said inner ridge is in sealing contact with said element;
    said ring contacting said valve housing only between said outer diameter and said outer annular ridge.

2. The valve structure of claim 1 wherein said metal ring includes a peripheral outer mounting flange forming the gas-tight seal with said housing.

3. The valve structure of claim 1 wherein displacement of said inner annular ridge is limited by the flexing of said annular groove to a distance on the order of 0.1 mm.

4. The valve structure of claim 1 wherein said metal ring is stainless steel.

5. The valve structure of claim 2 wherein each side of said flange is plated with a base layer of nickel and an upper layer of copper, the thickness of said layers being approximately equal to one half the thickness of said ring.

6. The valve structure of claim 5 wherein said valve housing comprises two separable halves connected at a transverse plane containing said mounting flange, each half contacting said flange with an annular knife edge to form a gas-tight seal.

* * * * *